Feb. 5, 1929.

J. C. CONN 1,701,173

MECHANICAL MOVEMENT

Filed Dec. 22, 1926

INVENTOR
JOSEPH C. CONN
BY
ATTORNEY

Patented Feb. 5, 1929.

1,701,173

UNITED STATES PATENT OFFICE.

JOSEPH C. CONN, OF BOONTON, NEW JERSEY.

MECHANICAL MOVEMENT.

Application filed December 22, 1926. Serial No. 156,279.

The present invention relates to an improvement in mechanical movements more particularly of the type in which rotary motion is translated into oscillatory motion. One object has been to provide a simple and compact combination of mechanical agencies which will effect movement of an oscillating member through a wider arc than that ordinarily obtainable by means of a barrel type cam. A further object of the invention has been to provide mechanism for the purpose indicated and which may be fitted advantageously into portions of machines not now commonly utilized for housing operative mechanical devices. For example, it is contemplated that a mechanical movement employing my present invention may conveniently be incorporated in a corner or corner portions of machines, thereby effecting an economy of space which would not be possible in using some known devices for translating rotational movement into oscillatory movement.

One embodiment of my invention is illustrated in the drawings accompanying the present specification and in which—

Figure 1:
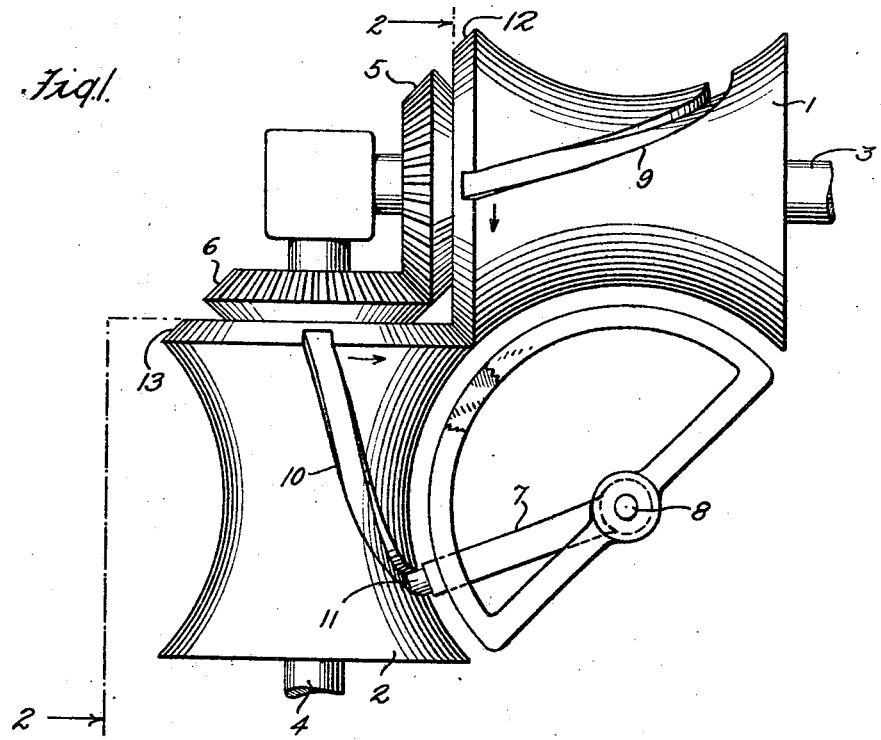
Figure 1 is a top plan view.
Figure 2:
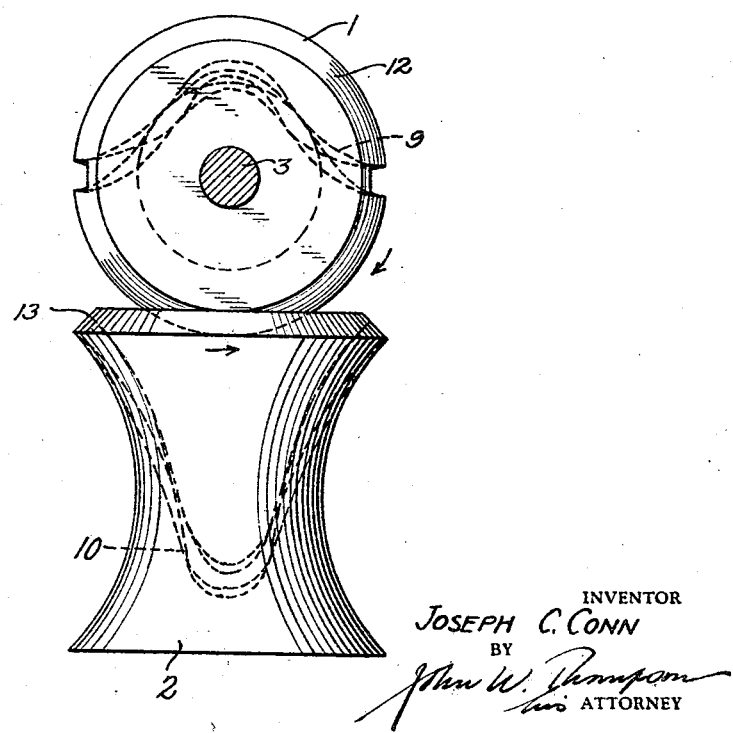
Figure 2 is a view in elevation, both figures being essentially diagrammatic in character.

Referring to the figures, a mechanical movement embodying my invention comprises a pair of rotatable cams, 1 and 2, mounted on shafts 3 and 4 respectively, said cams being driven in synchronized relation by any suitable driving means applied to one of said shafts, as shaft 3, and thence to a bevelled gear 5, from which motion of rotation is transmitted to bevelled gear 6 on shaft 4. The cams 1 and 2 will preferably be of such form that the peripheral surface of each will have a curved or circular cross sectional contour and a curved longitudinal sectional contour, the latter usually being an arc of a circle.

Where it is desired to translate the rotary motion of cams 1 and 2 into oscillatory motion of a lever, as 7, pivoted at 8, the cams will be provided with suitable cam surfaces, which in the present illustration are shown as forming wall portions of cam grooves 9 and 10 respectively, intersecting the peripheral cam surface. A cam follower 11, forming part of or secured to the lever 7, is positioned to extend into the cam grooves 9 and 10 and to operatively engage cam surfaces therein. Cams 1 and 2 are also provided at their adjacent ends with opposed peripheral end surfaces, 12 and 13 respectively, said surfaces being shown as bevelled and, in the illustrated embodiment, contiguous in the axial plane occupied by the axes of the cams, although such contiguity is not considered essential in all forms of the device. Cam grooves 9 and 10 are arranged with their ends opening through the opposed surfaces 12 and 13 respectively and are positioned so that the open ends of groove 10 will periodically come into alignment with the open ends of groove 9 during rotation of the cams.

In operation the cams are rotated in synchronism by the means hereinabove suggested, or other suitable means, so that the cam follower 11 alternately engages the grooves 9 and 10, and is moved longitudinally with respect to said cams by rotation thereof. Thus, for example, assuming that operation of the apparatus is begun with the lever 7 occupying the position in groove 10 indicated in Figure 1, further rotation of the cams in the direction of the arrows will move the follower in a clockwise direction until it reaches the reversing portion in cam groove 9, whereupon its direction will be reversed and a similar traverse and reversal will be effected in groove 10, this cycle of operation being periodically repeated during continued rotation of the cams 1 and 2.

From the foregoing description of my improved mechanical movement and the statement with respect to operation thereof, it will be apparent that it may conveniently be applied to machines of widely varying character. The arrangement of the cams with their axes inclined with respect to each other lends itself to a machine design in which the utilization of corner spaces is important. Other advantages will be apparent from a more careful study of the invention and its application to different types of machines.

Claims:

1. A mechanical movement comprising a pair of rotatable cams mounted with their axes at an angle to each other, means for driving said cams in synchronized relation, an oscillatable cam follower, and cam surfaces on each of said cams adapted to move said follower toward and away from the other cam during continued rotation of said cams in one direction.

2. A mechanical movement comprising a pair of rotatable cams mounted with their axes at an angle to each other and having opposed peripheral end surfaces, a cam groove arranged in each of said cams and having its ends opening through one of said peripheral end surfaces, an oscillatable cam follower operatively engaging said cam grooves, and means for driving said cams in synchronized relation.

3. A mechanical movement comprising a pair of rotatable cams mounted with their axes at an angle to each other and each having a peripheral end surface in rolling contact with a peripheral end surface of the other, means for driving the cams in synchronized relation, a cam follower, and cam surfaces in each of said cams arranged to periodically engage and oscillate the cam follower during continued rotation of said cams in one direction.

4. A mechanical movement comprising a pair of rotatable cams mounted with their axes at an angle to each other, and each having a bevelled peripheral end surface in rolling contact with a bevelled peripheral end surface of the other, means for driving the cams in synchronized relation, and a cam groove in each cam having it ends opening through said bevelled peripheral end surface, the ends of the groove in one cam being positioned to align periodically with corresponding ends of the grooves in the other cam.

5. A cam consisting of a body portion having a peripheral surface of curved cross sectional contour and curved longitudinal sectional contour and a cam groove arranged with both ends opening through the same end of said cam.

6. A cam consisting of a body portion having a peripheral surface of circular cross sectional contour and of curved longitudinal sectional contour and presenting cam surfaces which intersect the same end of said cam at points substantially 180 degrees apart.

In testimony whereof, I have signed my name to this specification this 18th day of December, 1926.

JOSEPH C. CONN.